Sept. 6, 1927.   S. G. BONAPARTE   1,641,313
BAKE OVEN
Filed Feb. 27, 1922   4 Sheets-Sheet 3

Inventor:
Swan G. Bonaparte
By Fincher & Lagaard
his Attorneys.

Sept. 6, 1927.

S. G. BONAPARTE

BAKE OVEN

Filed Feb. 27, 1922

Inventor:
Swan G. Bonaparte
By Fischer & Lagaard
his Attorneys.

Patented Sept. 6, 1927.

1,641,313

UNITED STATES PATENT OFFICE.

SWAN G. BONAPARTE, OF ST. PAUL, MINNESOTA.

BAKE OVEN.

Application filed February 27, 1922. Serial No. 539,620.

My invention relates to baking machinery and has for its object to provide a machine of the continuous type having an endless carrier on which articles to be baked are carried, said carrier being positioned within and passing through a single open chamber.

Another object is to provide means for heating the said baking machinery including means for distributing the heat to any desired point required within said open chamber.

Another object is to form the carrier with means for alternately opening the same so that the heat may pass directly through a portion of the same.

Another object is to provide means for quickly and effectively adjusting the opening of the carrier.

Another object is to provide a plurality of heating devices within the oven having associated therewith a number of vertical flues and a plurality of inter-connecting horizontal flues with means for directing the heated gases from said vertical flues through any of said horizontal flues.

The full objects and advantages of my invention will appear in connection with the detailed description thereof and are particularly pointed out in the claims.

In the drawings illustrating the application of my invention in one form:—

Fig. 6 is enlarged detail view showing the matter of supporting the carrier of the invention.

Fig. 7 is a cross sectional view of one of the plate members forming the carrier proper.

Figure 1:
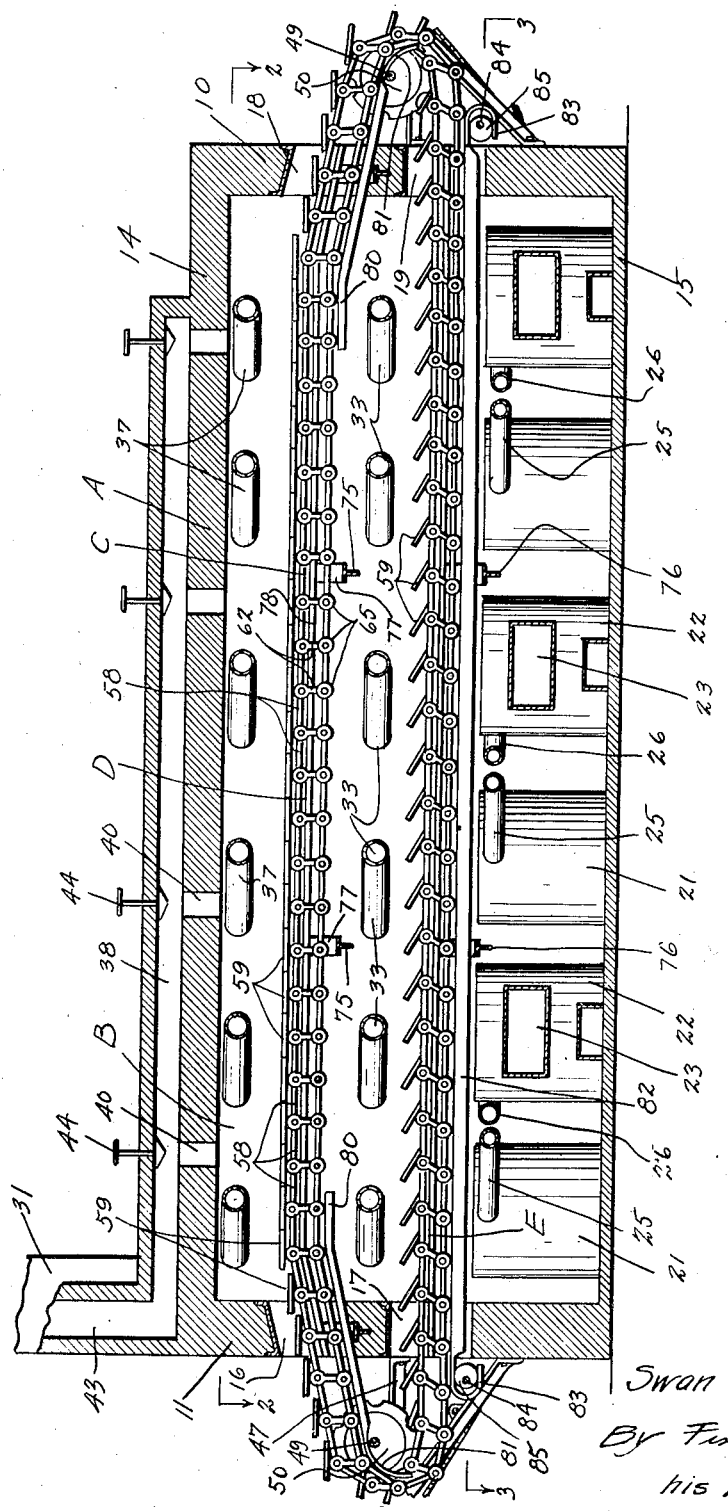
Fig. 1 is a longitudinal sectional view taken on line 1—1 of Figure 2.

In Figure 1, I have shown my invention as applied to an oven indicated in its entirety at A which may be constructed of brick or any other suitable material, and is formed with end walls 10 and 11, side walls 12 and 13, a ceiling 14, and a floor 15. The exact construction of this portion of the invention may be made to conform with the well-known principles of structural design and need not be described in this application. The entire interior of the oven A indicated at B forms one large open chamber in which the entire mechanism comprising my invention is positioned through which the articles to be baked are continually passed.

The invention consists primarily of a continuous carrier C which is formed with an upper run D, and a lower run E spaced from one another as best shown in Figure 1, which runs extend in end wall 10. This carrier comprises a number of plates 20 hingedly connected together and supported thereon which plates serve to carry the articles to be baked and to convey the same from without the device on one side through the open chamber B of oven A and discharge the same at the other end of the device.

Figure 3:
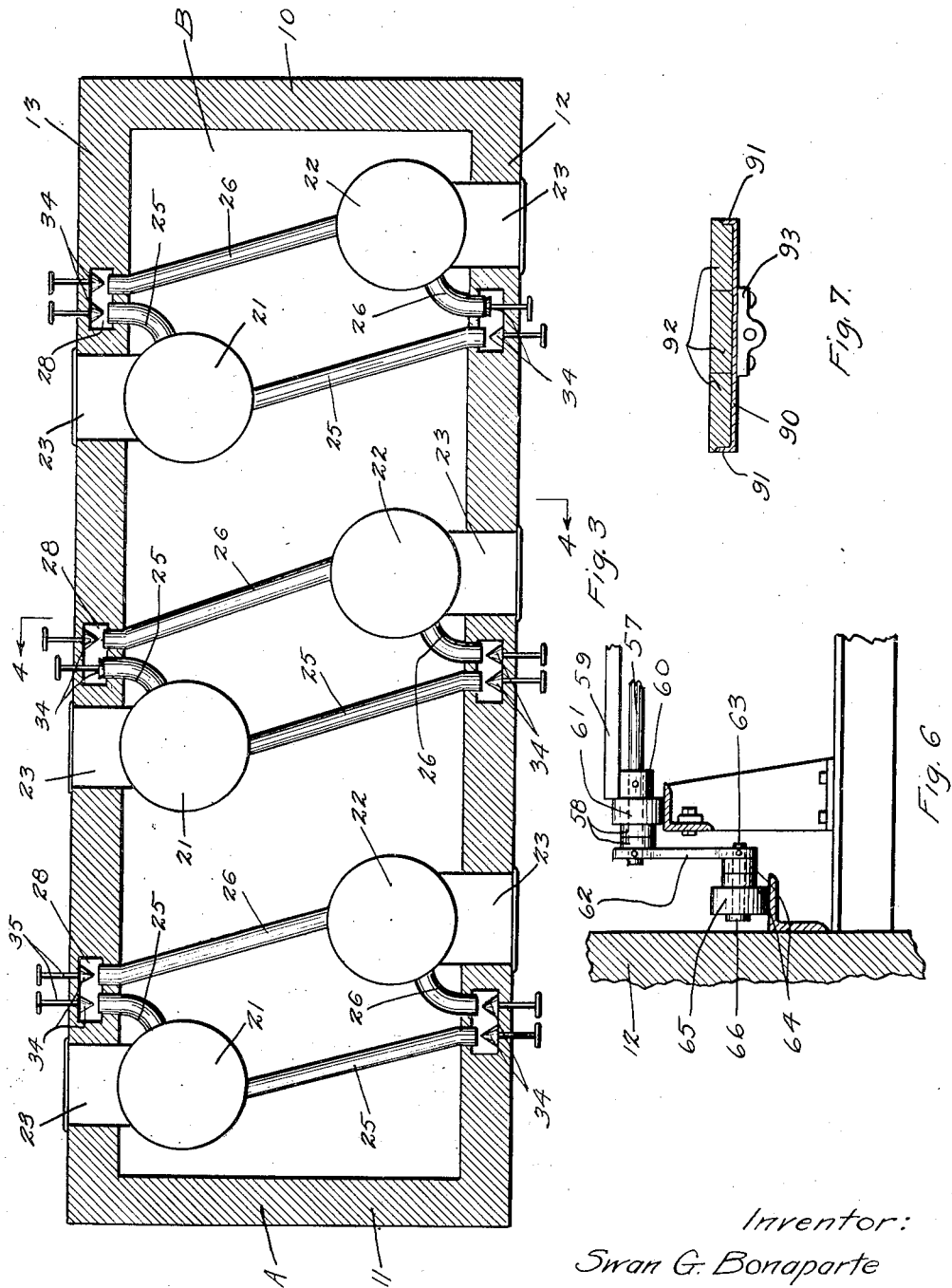
Fig. 3 is a plan sectional view taken on line 3—3 of Figure 1.

The means for heating the chamber B consists of a number of furnaces 21 and 22 which are arranged in two rows in staggered relation to one another upon the floor 15 as clearly shown in Figure 3. These furnaces may be of usual construction and are formed with fire doors 23 which extend through the side walls 12 and 13 of oven A so that the said furnaces may be fired from without the machine. These furnaces may be constructed to burn wood, coal, coke, or any other suitable fuel, in the ordinary manner. Each of the furnaces 21 and 22 is provided with two sets of smoke flues 25 and 26 which extends substantially horizontal and connect with vertical flues 27 and 28 formed in the walls 12 and 13 respectively I provide as many vertical flues 28 as there are furnaces so that the same may be connected with the furnaces by means of a flue 26 of one furnace and a flue 25 of another furnace.

For regulating the heating effect of the smoke flues 25 and 26 the oven is provided with conical shaped valves 34 which are mounted on valve stems 35 extending through the walls 12 and 13, which valves are operable from the exterior. When the valves 34 are drawn outwardly as shown in Figure 3 the flue gas from the furnaces may flow through the respective flues 25 and 26 and into the corresponding flues 27 and 28. When, however, said valves are forced inwardly the conical construction of the same cause the said valves to completely close the openings of the flues 25 and 26 into the flues 27 and 28 so that the passage of heated gases into the said flues is obstructed. By this means it can clearly be seen that the heat and gases of each furnace may be forced to travel to either side of the oven or when a furnace is completely out of commission the flues connected therewith may be completely cut off from flues 27 and 28 and the same closed so that the said furnace is entirely shut off and the draft for the other furnaces not affected. In this manner the heat of each of the furnaces is distributed to both sides of the device so that a more uniform heating effect can be produced. All of the vertical flues 27 and 28 extend upwardly through the walls 12 and 13 and terminate and connect with two horizontally positioned flues 29 and 30 extending along the entire length of the said walls near the upper portions thereof. Flue 29 leads to a chimney 31 positioned at one end of the oven A and flue 30 leads into the chimney 32 positioned at the other end of the same. In this manner the flue gases formed by the combustion within the furnaces 21 and 22 may be directed into the two chimneys 31 and 32.

Figure 2:
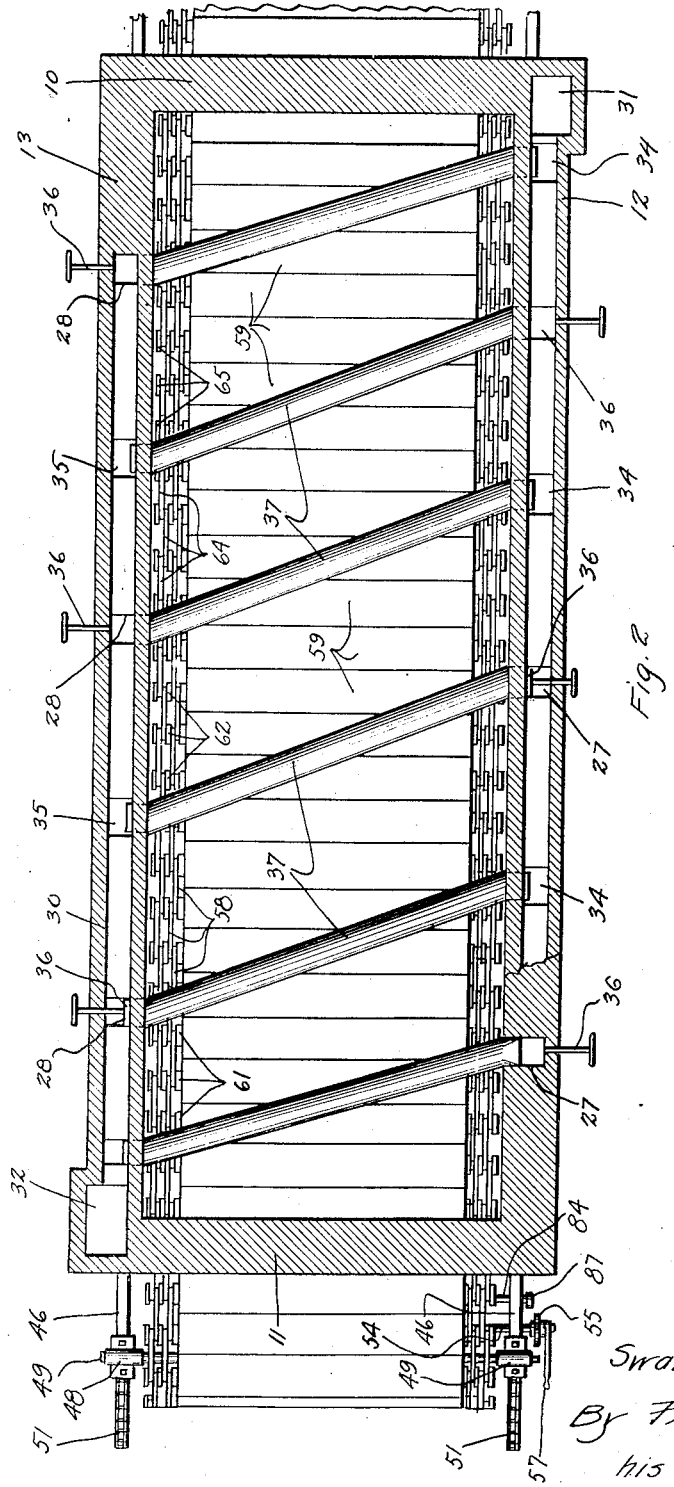
Fig. 2 is a plan sectional view taken on line 2—2 of Figure 1.

In addition to the foregoing flues for heating the chamber B, I provide additional cross flues 33 interconnecting the vertical flues 27 and 28 with the horizontal flues 29 and 30 which are positioned between the two runs D and E of the carrier C. These flues are provided to heat the underside of the upper run D of the carrier so that the articles to be baked are uniformly heated from below as well as from above. An inspection of Figures 1 and 2 will clearly bring out the arrangement of the said flues. As will be noted in Figure 2 one flue is provided at 33 for each of the vertical flues 27 and 38. These flues extend horizontally across the oven and connect with shorter vertical flues 34 and 35 which lead upwardly and also connect into the horizontal flues 29 and 30. The connection of the said flues 33 with the flues 27 and 28 is made of rectangular cross section which is of a width exactly equal to the width of the said flues 27 and 28. In actual construction the said vertical flues 27 and 28 are preferably reduced in width immediately after the entry of the two flues 25 and 26 into the same so that said flues are substantially rectangular as shown in Figure 2. For directing the passage of the flue gases through these flues I provide valves 36 similar to the valves 34 previously mentioned, which valves are in a shape of a triangular prism being of rectangular formation as viewed from the top. These valves are adapted to slide into the openings of the flues 33 so that when the valves are forced completely inward communication to the said flue is completely cut off. These valves furthermore are of such a size that when the same are drawn outwardly an inclined lower surface is exposed within the flues 27 and 28 and all connection above said valve is cut off by means thereof. When the valve is in this direction the gas rising through the vertical flue 33 and into the flues 34 and from there to the horizontal flues 29 and 30 and into the chimney 31 and 32. It can readily be comprehended by this construction that the heat from all of the flues 27 and 28 may be directed through the flues 33 or the said flues may be cut out and the heated gases allowed to travel upwardly beyond the same.

For heating the upper portion of the chamber B or the oven A I provide a second set of transversely positioned interconnecting cross flues 37 which are positioned immediately below the ceiling 14 of oven A and which run parallel to flues 33 and which connect the vertical flues 27 and 28 with the other flues 34 and 35 in a manner identical with flues 33. Additional valves 36 are also provided which serve to cause the heated gases to pass through the said flues or which permit the gases from the flues 27 and 28 to directly enter the horizontal flues 29 and 30. By proper manipulation of valves 36 it can readily be seen that the heat may be caused to flow through either of the sets of flues 33 or 37 and through any of the said flues at any location within the oven. In this manner the heat could be directed as required and the amount of heat regulated at will so that the oven can be kept at any temperature in any location within the same and the degree of heat at any location can be carried at will.

For removing the steam and vapors which accumulate within the chamber B during the process of baking and for quickly reducing the temperature I provide two longitudinally positioned horizontal passageways 38 and 39 which are formed at the upper portion of ceiling 14 of the oven A. These flues communicate by means of a number of ducts 40 and 41 with the interior of chamber B and are themselves connected by means of a header 42 to a single chimney 43. Each of the ducts 40 and 41 is controlled by a valve 44 so that the escape of the vapors and steam from chamber B can be directed to any location within the oven. When the draft produced by the chimney 43 is not sufficient to remove the steam and vapors as rapidly as required a blower may be installed to expedite the removal of the same. Such a device, however, is well known in the art and need not be shown in the drawings.

Figure 4:
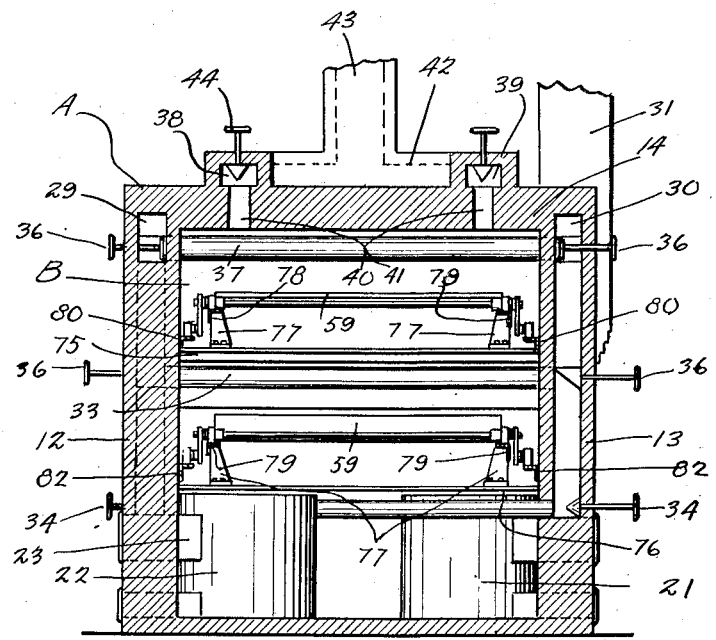
Fig. 4 is a cross sectional view of the device taken substantially on line 4—4 of Figure 3.

The construction of conveyer C can best be comprehended from Figures 1 and 4. At each end of the oven A is positioned a pair of cast brackets 46 which are rigidly attached to the wall of the same and project outwardly therefrom. These brackets are formed with the horizontal guide-ways 47 extending longitudinally of the same and the oven proper. Slidably mounted upon the guide-ways 47 are a pair of bearings 48 in which is journalled a transversely positioned shaft 49. Shaft 49 carries two sheaves 50 which support the conveyer C as will be presently described.

For adjusting the tension of the belt comprising my conveyer I slide the bearings 48 along the guides 47 thus bodily moving shaft 49 and sheaves 50 mounted thereon towards or away from the oven proper. The device for accomplishing this result comprises a pair of chains 51 which are secured to the said bearings 48 and which pass over idlers 52 journalled at the extreme end of the brackets 46. These chains are rigidly attached to a pair of small drums 53 rigidly secured to a transverse shaft 54 which is journalled in bearings secured to the brackets 46 which are not shown in detail in the drawings. When this shaft is rotated both of the chains 51 are simultaneously tightened and the two sheaves 50 advanced along the guides 47 in proper relation. For rotating shaft 54 I attach thereto a ratchet wheel 55 which is held from movement by a pawl 56 pivoted to the said bracket 46 and which may be operated by means of a handle 57 journalled on said shaft 54 which handle is provided with a pawl 58 pivoted thereto and adapted to engage the ratchet wheel 55. It can readily be seen with this structure both of the sheaves 50 can be simultaneously advanced towards or away from the oven proper.

The construction of the belt proper comprising the conveyer can best be seen in Figures 1, 4, and 6. The same is built upon a number of transverse shafts 57 which extend substantially across the entire chamber B of oven A. These shafts are pivotally connected together by links 58 clearly shown in Figure 1, which links form the same into a continuous belt or chain. Upon the central portion of each of the shafts 57 is journalled a flat plate 59 which plate is formed with depending lugs 60 by means of which the said plate may be rigidly attached to shaft 57 in any suitable manner so that the same rotates said shaft. Between the links 59 and lug 60 is mounted a roller 61 which rides free upon the shaft 57. At the extreme end of the said shaft is rigidly secured thereto a depending arm 62 which is securely fastened on the end of said shaft. This arm has secured to its lower end a stub shaft 63 which shaft has attached to it a number of links 64 identical with links 58. In addition to this a roller 65 is freely journalled on the end of the shaft 63 similar to roller 61 and is held in place thereon by a cotter-pin 66 which may be formed integral with said shaft is desired or which may be attached thereto as required. The construction of this carrier clearly discloses two substantially independent chains which are formed with rollers and interconnecting said arms, one of said chains having mounted thereon the plates on which the articles to be baked may be placed.

Sheaves 50 are formed with sockets 67 positioned along the periphery of the same, which sockets are adapted to engage the rollers 61 of carrier C to rotatably carry the same about the axes of the said shaft 49 as the sheaves are rotated. In addition to this the runs D and E of carrier C are supported intermediate of the said sheaves by means best shown in Figures 1, 4, and 6. As seen in Figure 1 sets of T irons 75 and 76 are set into the walls 12 and 13 of oven A which T irons are spaced equally throughout the entire structure and which are positioned slightly below the said runs D and E as clearly indicated. Upon each of the said T irons inwardly from the point of attachment to the wall of the same is positioned an upright standard 77 which supports a number of longitudinally positioned angle irons or rails 78 and 79 which serve as tracks upon which the rollers 61 are adapted to travel. By this means both of the runs D and E of conveyer C are held in horizontal position throughout their entire length between the supporting sheaves 50 at the ends of the oven. In conjunction with the rails 78 I provide similar angle iron rails 80 which are directly attached to the inner surface of the walls 12 and 13 and which project through the openings 16 and 18 previously referred to. These rails extend only for a short distance into the oven and are rigidly secured in place. These rails are so positioned that the lowermost rollers 65 ride upon the same and hold the arm 62 so positioned relative to the conveyer proper that the plates 59 run in a horizontal and continuous relation to one another as clearly shown in Figure 1. At the extreme outwardly projecting end of the rails 80 the same are formed with a downwardly curved portion 81 which serves to engage rollers 65 after the conveyer passes over sheave 50 and which serve to hold plates 59 in relatively horizontal position.

Figure 5:
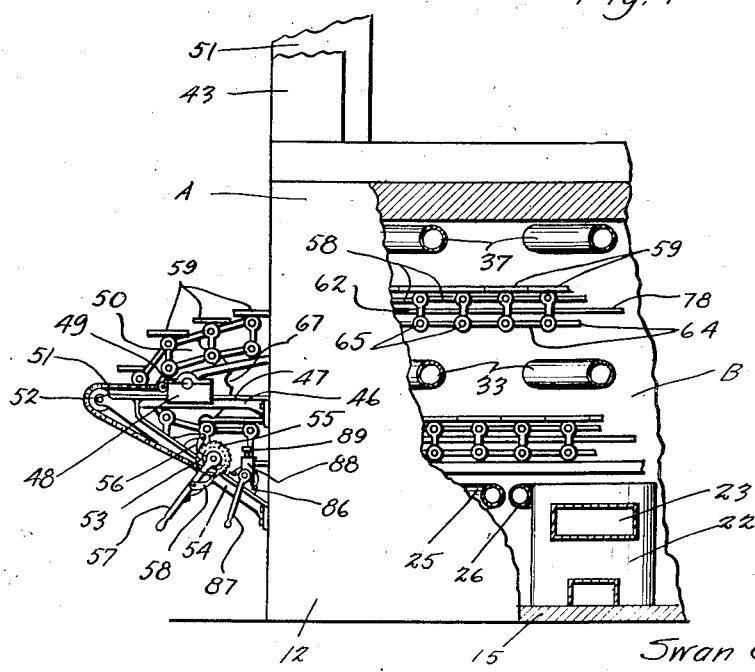
Fig. 5 is a fragmentary view of a portion of the machine shown in Figure 1 with the parts in relatively altered positions.

The track for rollers 65 in the lower run E of conveyer C consists of two angle irons 82 which are supported only at the ends thereof and which permit of sufficient rigidity to hold all of the rollers throughout their entire length in proper relative position. These rails 82 are formed at their extreme ends with loops or U-shaped portions 83 within which are rotatably mounted eccentrics 84 which are rigidly secured to transversely positioned shafts 85. The shafts 85 are journalled in bearings 86 formed on the brackets 46 previously described for supporting the main shafts 49. By rotation of either of the shafts 85 the said rails 82 are simultaneously raised or lowered at either end thereof. It can thus be readily seen that by raising the said rails the rollers 65 are brought closer to the rollers 61 and the arms 62 on that account caused to assume an inclined position as indicated in Figure 1. This has the effect of tilting the plates 59 so that a series of openings are formed through the lower run of the belt E by means of which the heated air below the run of the conveyer may pass directly through the same and aid in heating the underside of the upper run D on which the articles to be baked are positioned. By turning eccentrics 84 to lower the rails 82 the arms 62 may assume a perfectly vertical position parallel with the arms in the upper run D which position is shown in Figure 5. In making either adjustment it becomes necessary to first slacken up the entire conveyer by manipulating the lever 57 which controls the belt tightening device previously described.

The means for operating shafts 85, for adjusting the said plates 59 consists of a handle 87 which is rigidly attached to the end of each of said shafts 87 which is rigidly attached to the end of each of said shafts 85. A boss 88 formed on the top of bearing 86 has a set screw 89 screwed into the same by means of which the said shaft may be rigidly held from movement so that when the position of rails 82 has been properly secured the same may be held by means thereof. In this manner the position of the plates 59 may be adjusted at will and the said plates caused to travel continuously in their adjusted position.

In Figure 7 I have shown a modified form of one of the plates 59. In this device a sheet iron base 90 is employed which is formed with upturned flanges 91 extending along the edges of the same. Upon the said plate and between these flanges are positioned thin fire-brick 92 which form a heat resisting covering for the said plates. A pair of castings 93 riveted to the lower surface of base 90 takes the place of the lugs 60 and serves to attach the entire structure to the shaft 57. It can readily be comprehended with this device that a surface is provided upon the conveyor proper which is fully heat resisting and which may be readily repaired as the sections of the same become broken or burn out.

This oven may be used for baking bread, hard tack, pastry or any other similar article. In use the articles to be baked are placed in suitable pans upon the flat plates 59 either by hand or by automatic means not disclosed in this invention. The same may then be caused to travel along from the upper run D of conveyer C which may be driven in a suitable manner by means of the sheaves 50. As the same passes through the chamber B the heating means within the same causes the articles to be baked so that when the articles leave the oven in the farther end the same are baked and may be removed from the said conveyer in any desirable manner. The principle advantage of the invention resides in the ability to heat the upper run D of the conveyer on which the articles are being baked with equal ease from below and above. Heretofore it has been difficult to secure sufficient heat below the upper run as well as above the same, and for regulating and maintaining the required temperature at any required position along the entire conveyer. By forming passage-ways through the lower run D of conveyer C the heat accumulated around the furnaces 21 and 22 and produced by the flues 25 and 26 may be convected to the underside of plates 59 where the said heat may be utilized for properly baking the articles positioned thereon. It can readily be seen that with my invention ordinary fuel may be used such as wood, coal, or coke, and that by means of the valves as described the heat may be directed wherever required so as to produce the desired baking results thereby greatly reducing the cost of operation of the device.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above sent forth within the scope of the following claims.

I claim:

1. A bake oven comprising a casing, a continuous carrier within the same having an upper and lower run, means positioned above said casing for heating the upper portion of the carrier, heating means positioned below said carrier, means for conducting heat therefrom through said lower run for heating the underside of said upper run and means for regulating the amount of heat conducted to said carrier from below.

2. A bake oven comprising a casing, a continuous carrier within the same having an upper and a lower run formed of separable members, heating means positioned above said upper run, heating means positioned below said lower run and means for separating said separable members to conduct heat through said lower run.

3. A bake oven comprising a casing, a continuous carrier within the casing formed of a series of separable members, heating means within the casing and means for separating or closing certain of said members to control the flow of heated air through the same.

4. A bake oven comprising a casing, a continuous carrier within said casing, a normally closed belt-like portion formed on said carrier and means for closing or opening said belt-like portion to permit the passage of heat therethrough in portions thereof.

5. A bake oven comprising a casing, a continuous carrier within said casing, a series of members supported on said carrier adapted in conjunction to form a continuous surface on said carrier and means for moving said members throughout a portion of the carrier to close the same or to form openings through said carrier for the passage of heat through the same.

6. A bake oven comprising a casing, a continuous carrier within the same having an upper and lower run, a series of members supported on said carrier adapted in conjunction to form a continuous surface on said carrier throughout the upper run and means associated with the lower run of said carrier for moving said members to form openings through said lower run whereby heat may be passed through the same.

7. A bake oven comprising a casing, a continuous carrier positioned within the same having an upper and lower run, a continuous flat supporting member formed on said upper run, heating means positioned above said upper run, heating means positioned between said upper and lower run, heating means positioned below said lower run, and means for convecting said heat from said lowermost heat means through said lower run and to the underside of said continuous flat member.

8. A bake oven comprising an endless belt formed of a pair of chains having a plurality of links, shafts extending across between said chains and serving as pivots for said links, plate like members secured to said shafts, rollers mounted upon said shafts, depending arms secured to said shafts, a stud shaft secured to the lowermost portion of each of said arms, links pivoted to said stud shaft, a roller mounted upon said stud shaft and a fixed guideway for guiding said first set of rollers and an adjustable guideway for guiding said second set of rollers.

9. A continuous carrier comprising a plurality of plates, links pivotally connected to said plates, arms connected to said plates in fixed relation thereto, a plurality of links connected to said arms, means for independently guiding said plates and arms for causing said plates to travel in fixed relation to one another, and means for adjusting said last named means so that the relative position of said plates may be varied at will.

10. A bake oven comprising a casing having a series of vertical flues positioned on opposite walls of the same, a number of independent heating units positioned adjacent said flues, horizontal flue members connecting each of said heaters with the vertical flues adjacent the same on opposite walls of said casing, a continuous belt positioned above said flues and extending through said casing and additional horizontal flues positioned above said belt connected with said vertical flues.

11. A carrier comprising a plurality of plates, links pivotally connected to said plates, rollers attached to said plates, arms, secured to said plates, rollers attached to said arms, a set of rails for supporting said first named rollers, a second set of rails for supporting said second rollers, and means for adjusting the position of said second named rails to cause the arms to incline relative to said carrier whereby the relative position of said plates may be varied at will.

12. A bake oven comprising a casing having a series of vertical flues positioned on opposite walls of the same, a number of independent heating units positioned adjacent said flues, horizontal flue members connecting each of said heaters with the vertical flues adjacent the same on opposite walls of said casing, a continuous belt positioned above said flues and extending through said casing and a plurality of additional horizontal flues arranged diagonally across said casing and connected with said vertical flues on the two sides of said casing.

13. A bake oven comprising a casing, a continuous belt passing through said casing, a plurality of oppositely positioned vertical flues formed on the walls of said casing and horizontal flues connected with staggered vertical flues on opposite sides of the casing.

In testimony whereof I affix my signature.

SWAN G. BONAPARTE.